United States Patent [19]

Koerner et al.

[11] 4,274,977

[45] Jun. 23, 1981

[54] DEFOAMER PREPARATION AND PROCESSES FOR ITS PRODUCTION

[75] Inventors: Götz Koerner; Hans-Ferdi Fink, both of Essen, Fed. Rep. of Germany

[73] Assignee: Th. Goldschmidt AG, Essen, Fed. Rep. of Germany

[21] Appl. No.: 946,642

[22] Filed: Sep. 28, 1978

Related U.S. Application Data

[63] Continuation of Ser. No. 931,893, Aug. 8, 1978, abandoned.

[30] Foreign Application Priority Data

Aug. 9, 1977 [GB] United Kingdom ............... 33416/77

[51] Int. Cl.$^2$ .............................................. B01D 17/00
[52] U.S. Cl. ..................................... 252/358; 252/321
[58] Field of Search ................................ 252/358, 321

[56] References Cited

U.S. PATENT DOCUMENTS

| | | | |
|---|---|---|---|
| 3,076,768 | 2/1963 | Boylan | 252/321 |
| 4,028,218 | 6/1977 | Fink et al. | 252/358 |

FOREIGN PATENT DOCUMENTS

| | | | |
|---|---|---|---|
| 2443853 | 1/1976 | Fed. Rep. of Germany | 252/358 |
| 1453383 | 10/1976 | United Kingdom . | |

*Primary Examiner*—Benjamin R. Padgett
*Assistant Examiner*—J. L. Barr
*Attorney, Agent, or Firm*—Toren, McGeady and Stanger

[57] ABSTRACT

A defoamer composition having a high dispersion stability composed of a water-insoluble defoamer oil, a water-soluble emulsifier which is insoluble in the defoamer oil, and a mixture of a finely divided hydrophobic and hydrophilic silica. The composition of the present invention allows for the production of exceptionally stable dispersions thereof. A method for preparing the composition is also disclosed.

10 Claims, 5 Drawing Figures

DEFOAMER PREPARATION AND PROCESSES FOR ITS PRODUCTION

CROSS-REFERENCE TO RELATED APPLICATIONS

This is a continuation of application Ser. No. 931,893, filed on Aug. 8, 1978, and now abandoned.

BACKGROUND OF THE INVENTION

1. Field of the Invention

The invention relates to a defoamer preparation as well as to a process for the production of the preparation.

2. Description of the Prior Art

It is well known that defoamer preparations can be produced from water-insoluble defoamer oils, water-soluble emulsifiers and finely divided silica. German Offenlegungsschrift No. 24 43 853 is an example of a disclosure showing the state of the art. This Offenlegungsschrift relates to a preparation for defoaming aqueous solutions and dispersions and contains organo-silicon compounds and fillers, characterized by the fact that it consists of 0.2 to 7.5 weight % of highly dispersed silica or high dispersed aluminum oxide and 92.5 to 99.8 weight % of a methylpolysiloxane-polyoxyalkylene block copolymer, which contains 10 to 60 weight % of methylpolysiloxane and whose polyoxyalkylene block has more than 80 to 100 weight % propylene oxide units.

At the same time, 2 to 10 weight % of the block copolymer can be replaced by nonionic emulsifiers, which have an average HLB value of 8 to 14. The function of the water-insoluble defoamer oil is taken over by the so-called methylpolysiloxane-polyoxyalkylene block copolymer. The nonionic emulsifiers mentioned serve as water-soluble emulsifiers.

German Offenlegungsschrift No. 23 45 335 relates to a preparation for defoaming aqueous solutions or dispersions, characterized by a content of 80 to 95 weight % of a mineral oil or a vegetable or animal oil, 1 to 7.5 weight % of a highly dispersed silica or a highly dispersed aluminum oxide. It further contains 1.0 to 10 weight % of a methylpolysiloxanepolyoxyalkylene block copolymer which contains 10 to 60 weight % of methylpolysiloxane and whose polyoxyalkylene block has 80 to 100 weight % of propylene oxide units. Optionally, the preparation may contain 2 to 10 weight % of nonionic emulsifiers whose average HLB value is 8 to 14, the sum of the aforementioned components adding up to 100 weight %.

As the water-insoluble defoamer oils, combinations of mineral oils, vegetable or animal oils, and water-insoluble methylpolysiloxane-polyoxyalkylene block copolymers are used.

However, it turns out that the water-insoluble defoamer oils frequently are not miscible with the water-soluble emulsifiers and it is impossible or difficult to prepare dispersions of both constituents which are stable over a period of days or weeks.

SUMMARY OF THE INVENTION

We have discovered a new preparation of active defoamer materials which have a high dispersion stability and a method for preparation thereof. In so doing, it was discovered that stable dispersions may be obtained if the water-insoluble defoamer oils and the water-soluble emulsifiers are mixed with specific mixtures of silica. These preparations may be diluted with water. The resulting dispersions, in turn, have an excellent stability with respect to phase separation and also have outstanding defoaming effectiveness.

The defoamer preparation of the present invention comprises (a) 40–90 parts by weight of a water-insoluble defoamer oil, (b) 2–50 parts by weight of a water soluble emulsifier, which, however, is insoluble in component (a), (c) 3–20 parts by weight of a mixture of finely divided hydrophobic and hydrophilic silica and, optionally, (d) water in an amount required for the production of a stock solution or for the dilution of the defoamer preparation to a concentration convenient for use.

Especially preferred is a defoamer preparation, whose silica portion consists of 3–97 weight % of hydrophobic and 97–3 weight % of hydrophilic silica. Particularly preferred is a defoamer preparation whose silica portion contains at least 50 weight % of hydrophobic silica.

Since the addition of water is optional depending on what ultimate form of the preparation is desired, the defoamer preparation may be anhydrous. However, a stock emulsion may also be produced which, as a rule, contains about 10 weight % of the inventive preparation. The initial preparation or the stock emulsion may be diluted further for use. This dilution is determined essentially by the metering requirements in use.

DESCRIPTION OF THE PREFERRED EMBODIMENT

A preferred defoamer preparation is one wherein the finely divided silica contained in the preparation has a BET surface area greater than 50 m$^2$/g. Particularly preferred is a defoamer preparation which is characterized by the fact that the finely divided silica contained in this preparation has a BET surface area greater than 150 m$^2$/g.

Surprisingly, it turns out that, when using a silica mixture of hydrophobic and hydrophilic silicas, the dispersion stability, the stability of the water-diluted preparations and the defoamer effectiveness are maximized simultaneously. If the particular mixture which gives the most stable and most highly dispersed water-dilutable defoamer preparation is ascertained by preliminary experiments, then this stability and this high degree of dispersion may also be found once again in the preparation when diluted with water and the preparation then also has its maximum defoaming action. This was particularly surprising since it is well known to those skilled in the art that an antagonism normally is found between the emulsion stability of defoamer preparations and their effectiveness (see for example W. Noll, "Chemie und Technologie der Silicone"-Chemistry and Technology of the Silicones-, published by Chemie, 2nd edition, 1968, page 541, lines 11–20).

The concept of the distinction between hydrophilic and hydrophobic silica, in a manner similar to the concept of a hydrophilic and hydrophobic emulsifier, is a relative difference and not an absolute difference. For example, in the case of a hydrophilic silica, it is possible to hydrophobize a portion of the surface. Compared to a more fully hydrophobized silica, such a partially hydrophobized silica is to be regarded as hydrophilic. However, if it is compared with an untreated hydrophilic silica, it is to be regarded as hydrophobic. The decisive characteristic of the present invention is the use of a mixture of silica types of different hydrophilicity or hydrophobicity. Just as the hydrophilic/hydrophobic ratio of an emulsifier mixture must be matched to the material to be emulsified, so must the amount and ratio of the silica mixture be determined by preliminary experiments in the case of the object of the present invention. However, this requires no inventive effort, but falls within the range of activities with which an expert may reasonably be expected to be familiar.

A good possibility for finding the optimum mixing ratio of hydrophobic to hydrophilic silica, while at the same time determining the most advantageous total amount of silica for the respective defoamer combination is provided by a method which has become well known under the name of Simplex Technique and which is described in detail in the journal "Farbe und Lack", 1973, page 79.

The preferred process for preparing the defoamer preparation of the present invention is characterized by mixing components (a) and (b) optionally with heating, and then intensively stirring the hydrophobic silica into this mixture. The amount of hydrophilic silica required for achieving as fine a dispersion of components (a) and (b) as possible is then added with further stirring. In the case when water is added, the water addition may be made during or after the production of the defoamer preparation.

The finely divided silicas, contained in the inventive preparation, can be characterized by their surface area. The theory and measurement of the BET surface area are described in the Journal of American Chem. Soc. 60 (1938), page 309, and the skilled artisan would be familiar with them.

As has already been mentioned, a finely divided silica with a BET surface area greater than 50 m²/g, and especially greater than 150 m²/g is preferably used.

Finely divided silica having this surface area may be produced by various processes which are well known. Precipitated silica as well as silica obtained by flame hydrolysis may be used. The silica obtained by flame hydrolysis is particularly suitable.

Silicas having an appropriate surface area and whose surface may be modified with silanes, siloxanes or silazanes are suitable as hydrophobized silica. This modification is carried out by known procedures, for example, by the action of trimethylchlorosilane, dimethyldichlorosilane, octamethylcyclotetrasiloxane, or hexamethyldisilazane. Hydrophobizing agents and hydrophobizing processes are described, for example, in the above-mentioned book of W. Noll "Chemie und Technologie der Silicone" published by Chemie, 2nd edition 1968, page 369. It is, however, also possible to us silicone-free compounds, such as, waxes or organic amines, for example, octylamine or stearylamine. A silica hydrophobized in such a manner, can no longer be dispersed in water but floats on the surface of water.

As hydrophilic, finely divided silica the preferred silicas are those of the precipitated types which possess a high proportion of internal surface area. In contrast to hydrophobized silica, hydrophilic silica which has not been hydrophobized can be dispersed in water.

As has been mentioned already, partially hydrophobized silicas may also be used as components of the mixture. The mixtures have properties which, depending on the degree of hydrophobicity or hydrophilicity of the components and the mixing ratio, are comparable with emulsifier mixtures of higher or lower HLB values.

In principle, all of the conventionally known products may be considered for use in the water-insoluble defoamer oils or the inventive preparation. Hydrophobic polyoxyalkylenepolysiloxane block copolymers, such as are described, for example, in the German Offenlegungsschrift No. 23 45 335, are preferably used.

The structure of such block copolymers can be represented by the following formula the indices a, b, n or m are whole numbers and are the consequence of the requirement of the patent claim of the aforementioned German Offenlegungsschrift that the block copolymer should contain 10–60, and preferably, 15–30 weight % of methylpolysiloxane blocks, while the polyoxyalkylene blocks, in turn, should have 80 to 100 weight % of propylene oxide units. The indices b and m may also be 0. If b=0, then the product is linear; a and n always have finite values.

Silicone oils, especially dimethylsilicone oils may also be used as water-insoluble defoamer oils. Further suitable defoamer oils are hydrophobic polyethers, and particularly those which have a high content of propylene oxide units, for example, pure propylene glycols or their mono or diethers. Hydrophobic polyethers, with molecular weights greater than 1000 are especially useful. However, vegetable or animal oils which have been known for a long time as components of defoamers may also be used. Further suitable oils are alkyl phosphates whose alkyl residues contain at least 10 carbon atoms. The so-called synthetic ester oils, such as, for example, cetyl stearate, trimethylolpropane tripelargonate, dioctyl phthalate or dioctyl sebacate may also be used. Furthermore, mineral oils and especially paraffin oils are suitable. In addition, fluorocarbon oils, for example, perfluorinated polyalkylene glycols, such as, perfluoropolypropylene glycol, are suitable.

Water-soluble emulsifiers are well known. Nonionic emulsifiers are preferred, especially those which are liquid at room temperature or melt on moderate heating under the conditions of the inventive process. Mixtures of such emulsifiers may also be used. The following nonionic emulsifiers are especially suitable: ethoxylated fatty alcohols, ethoxylated fatty acids, ethoxylated fatty esters of polyols, such as, glycerol, sorbitol, or sorbitan, ethoxylated alkyl phenols, polyethers containing ethylene oxide and propylene oxide groups and water-soluble silicone polyethers. Water-soluble polyoxyalkylene-polysiloxane block copolymers are especially suitable. Furthermore, ethoxylated amines, amides, or amidoamines may be used. Ionic, water-soluble surfactants can also be used. Of the anionic surfactants, the sulfates and sulfonates of organic compounds must be especially mentioned. As cationic compounds, quaternary ammonium compounds with long-chain alkyl residues, as well as betaines, are suitable.

The defoamer preparations in accordance with the present invention are suitable for defoaming aqueous as well as nonaqueous systems. Preferably however, they are used for defoaming aqueous systems. The preparations are effective even in small amounts. Since the inventive defoamer preparations are readily dispersed in water, it is frequently unnecessary to prepare a dilutable stock emulsion. An advantage of the good dispersibility of the defoamer preparations lies in the fact that the active materials do not separate out at the surface. In the case of known systems, such a separation frequently leads to trouble when the defoamed products are used.

In the following examples, different inventive defoamer preparations, their production, as well as their stability and defoaming action are shown.

EXAMPLE 1

A water dilutable defoamer preparation is prepared which has the following composition:
83.5 parts by weight of water-insoluble defoamer oil,
10.0 parts by weight of water-soluble emulsifier,
6.5 parts by weight of finely divided silica.

As the defoamer oil, a water-insoluble polyoxypropylenemethylpolysiloxane block copolymer of the general formula is used. The R residue represents a butyl residue and $a=5$, $b=2$, $n=30$.

As the emulsifier, a polyoxyethylene-polyoxypropylenemethylpolysiloxane is used which is not soluble in the defoamer oil but which may be dissolved in water in any ratio and which had a cloud point of 29° C. in a 4% aqueous solution.

The finely divided silica used consists of a mixture of a silica which has a BET surface area of 200 m²/g and is completely hydrophobized with trimethylsilyl groups and a hydrophilic silica also with a BET surface area of 200 m²/g.

In the experimental series, described in this example, the mixing ratio of the two silicas is varied. The composition of the silica mixtures is given in FIG. 1.

The water-dilutable defoamer preparations are produced by first mixing the defoamer oil and the emulsifier with the help of a high-speed stirrer and then working in the hydrophobic silica first and subsequently mixing in the corresponding amount of hydrophilic silica under the same sitrring conditions.

Figure 1:
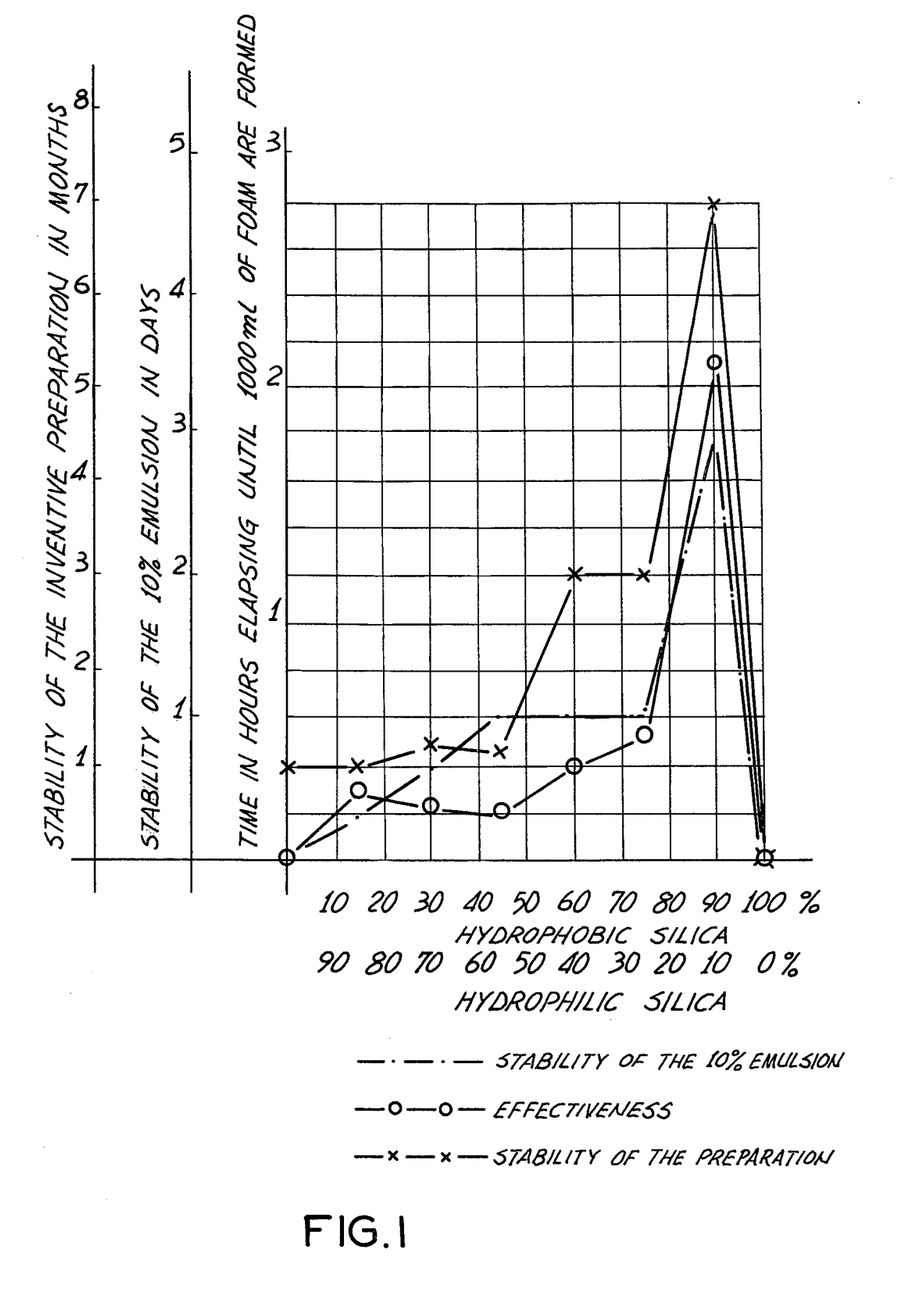
FIGS. 1, 2, 3, 4, and 5 are graphical representations of the stability of various preparations in accordance with the present invention and as described in the examples of the specification.

The preparations are evaluated essentially according to the following criteria:

1. The stability of the dispersion obtained is determined. For this purpose, the preparations are stored in a measuring cylinder at room temperature and observed to see whether and after what time phase separation takes place. In FIG. 1, the time at which phase separation becomes clearly visible is plotted against the composition of the silica mixture contained in the preparation.

2. The stability of the 10% aqueous emulsions prepared by slowly stirring water into the defoamer preparation is determined. One possiblity for determining the stability is to observe the dispersions, stored at room temperature, for separation, for example, creaming or phase separation. The time after which creaming of the 10% emulsion can be clearly detected is plotted as a function of the composition of the silica mixture contained in the preparation.

3. In addition, the antifoaming effect of the defoamer preparation is determined. For this purpose, an oil-free current of air is passed through 1000 ml of a 0.1% aqueous solution of dodecylbenzene sulfonate and a polyglycol ether of a fatty alcohol, until 1000 ml of foam have been formed. This current of air is introduced at a constant rate of 6 l/min through a sintered glass disk having a porosity of 1. When the volume of foam reaches 1000 ml, the air supply is interrupted by removing the frit from the measuring cylinder and 0.5 ml of the 10% emulsion of the defoamer preparation are added. This corresponds to 50 ppm of the diluted preparation. After the foam is destroyed completely, air is introduced once gain and the time is measured which is required for once more forming a foam volume of 1000 ml. This time is plotted in FIG. 1 as a function of the composition of the silica mixture contained in the preparation.

FIG. 1 shows that the stability of the defoamer preparation as well as the stability of the emulsion prepared from the defoamer preparation simply by stirring this preparation into water, is outstandingly good at one and the same mixing ratio, when the mixing ratio of the two types of silicas is coordinated exactly. The most stable defoamer preparation also shows the greatest effectiveness in the defoamer test.

EXAMPLE 2

Water-dilutable defoamer preparations are prepared, which have the following composition:
  80-x weight % of water-insoluble defoamer oil,
  20 weight % of water-soluble emulsifier, and
  x weight % of finely divided silica.

The finely divided silica consists of a portion of y weight % of the hydrophobized silica described in Example 1 and a portion of z weight % of the hydrophilic silica also described in Example 1, the percentages being based on the total silica portion.

As a defoamer oil, a silicone compound is used which has the formula mentioned in Example 1 and in which
  a has a value of 5,
  b has a value of 3,
  n=0 and
  R=$C_2H_5$.

As the emulsifier, a polyethersiloxane is used which is incompatible with the silicone compound but soluble in water. The water-dilutable preparation is produced as described in Example 1. The preparation are evaluated according to the criteria described in Example 1.

Figure 2:
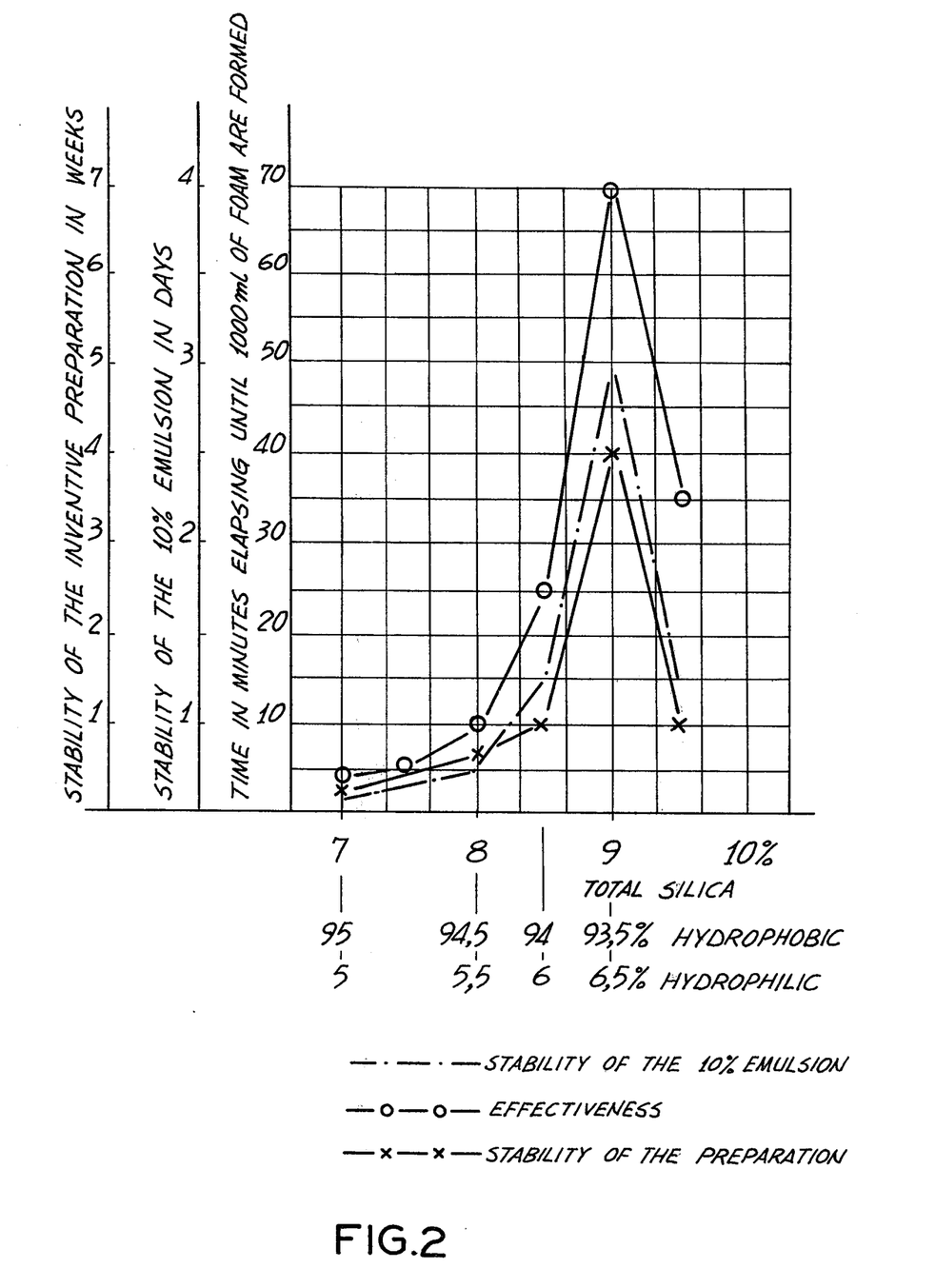

In FIG. 2, the values found are plotted as a function of the total amount of silica. In addition, the mixing ratios of hydrophobic silica to hydrophilic silica for the respective total amount of silica are noted on the abscissa.

In this example also, the diagram shows that all the evaluating criteria described have their maximum at one and the same silica concentration, and, in addition, at a quite specific mixing ratio of hydrophobic to hydrophilic silica.

EXAMPLE 3

Water-dilutable defoamer preparations are produced which have the following composition:
  72.0 parts by weight of water-insoluble defoamer oil,
  20.0 parts by weight of water-soluble emulsifier,
  8.0 parts by weight of finely divided silica.

As the defoamer oil, a water-insoluble butyl propylene glycol ether with a viscosity of ca. 150 $m^2/sec^{-1}$ is used.

As the emulsifier, which is insoluble in the defoamer oil but soluble in water, an alkyl polyether of the general formula is used, the cloud point of whose 4% solution is 34° C.

The finely divided silica used consists of a mixture of hydrophobized and hydrophilic silica, described in Example 1. In the experimental series described in this example, the mixing ratio of the two silicas is varied. The composition of the silica mixture is given in FIG. 3.

The defoamer preparations are produced as described in Example 1. The preparations are evaluated according to the criteria described in Example 1.

Figure 3:
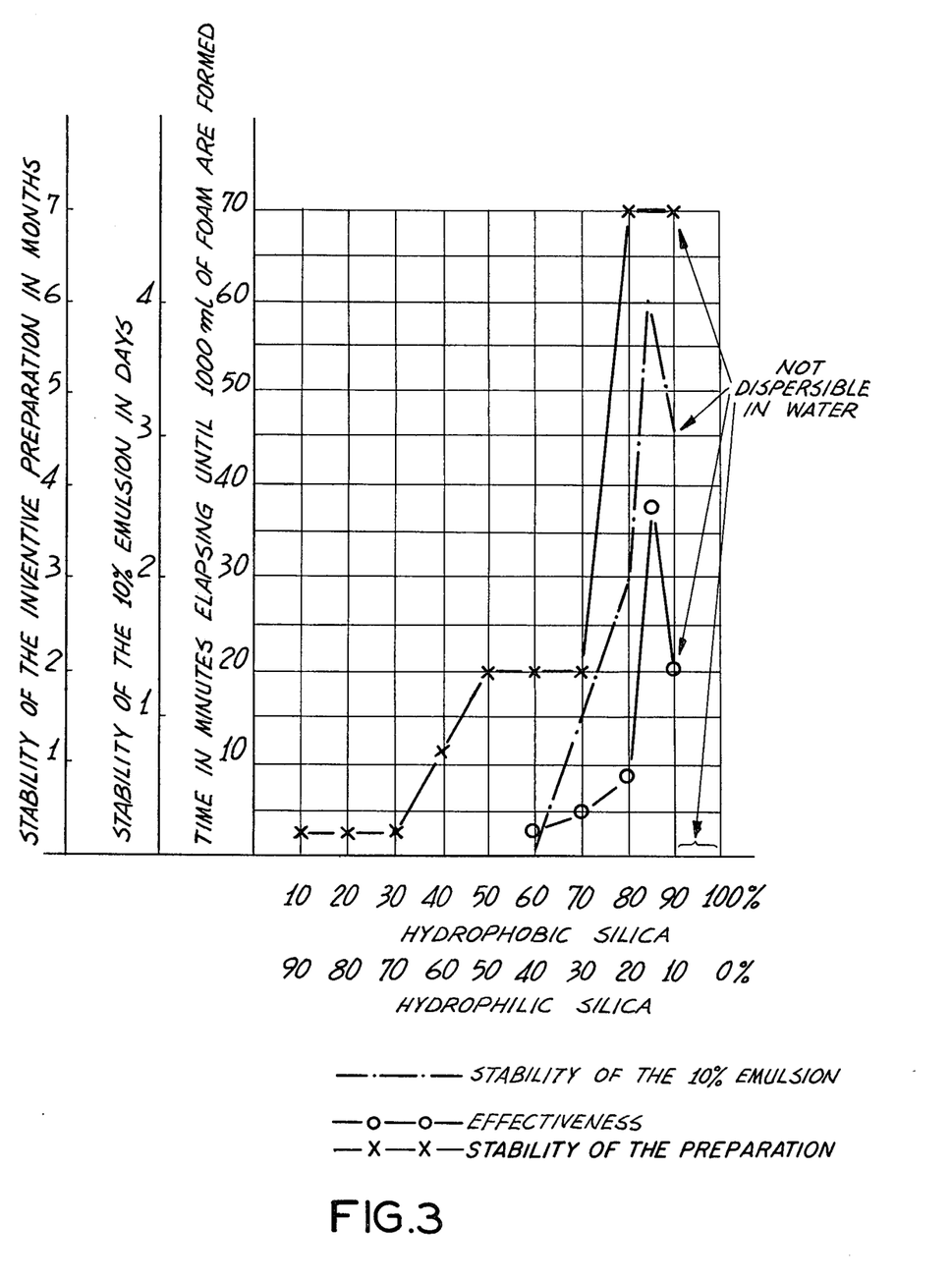

FIG. 3 shows that the stabilities of the preparations and of the 10% emulsion prepared from these as well as the effectiveness have their maximum at a specific mixing ratio of the two silicas. The effectiveness of the preparations was determined in this experimental series only for those products whose 10% emulsion in water is stable for at least one hour.

EXAMPLE 4

Water-dilutable defoamer preparations are produced which have the following composition:
  67 weight % of water-insoluble defoamer oil,
  20 weight % of water-soluble emulsifier, and
  13 weight % of a mixture of finely divided silica.

The finely divided silica used consists of a portion of y weight % of the hydrophobized silica described in Example 1 and a portion of z weight % of the hydrophilic silica also described in Example 1, both percentages being based on the total amount of silica.

As the defoamer oil, a silicone compound of the general formula with an average molecular weight of ca. 10,000 is used.

As the emulsifier, a mixture of sorbitan monooleate and poly(ethylene oxide)-sorbitan monooleate is used which is not soluble in the silicone oil but is soluble in water and which has an HLB number of 11.

Figure 4:
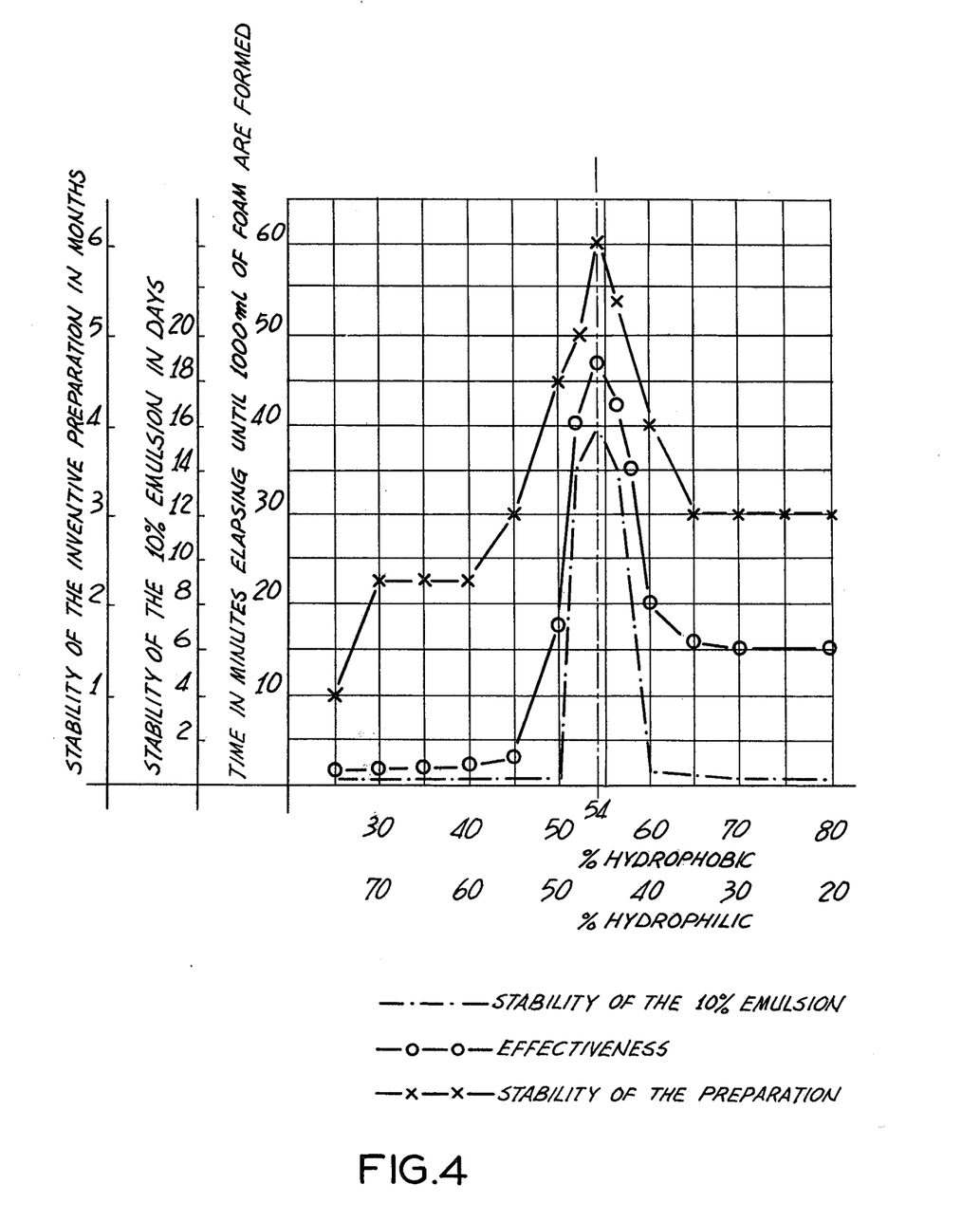

The water-dilutable preparation is produced as described in Example 1. The preparations are evaluated according to the criteria described in Example 1. In FIG. 4, the values of the composition, which were found, are plotted as a function of the silica mixture contained in the preparation.

FIG. 4 shows that the stabilities of the preparations and of the 10% emulsion prepared from them as well as the effectiveness of the preparations have their maximum at a specific mixing ratio of the silicas.

EXAMPLE 5

Water-dilutable defoamer preparations are produced with the following composition:
  90—x weight % of water-insoluble defoamer oil,
  10 weight % of water-soluble emulsifier,
  x weight % of a mixture of finely divided silica.

The finely divided silica used consists of a portion of y weight % of the hydrophobized silica described in Example 1 and a portion of z weight % of the hydrophilic silica also described in Example 1, the percentages being based on the total amount of silica.

As the defoamer oil, a mixture of 85 parts by weight of a dimethylpolysiloxane, terminated with trimethylsilyl groups and having a viscosity of 1000 mm$^2$/sec.$^{-1}$ at 298° K. (25° C.), and 15 parts by weight of an α-ω-dihydroxydimethylpolysiloxane with a viscosity of 120 mm$^2$/sec.$^{-1}$ at 298° K. (25° C.) is used.

As the emulsifier, a mixture of ethoxylated nonylphenol which has an HLB number of 10 and is insoluble in the defoamer oil but miscible with water is used.

Figure 5:
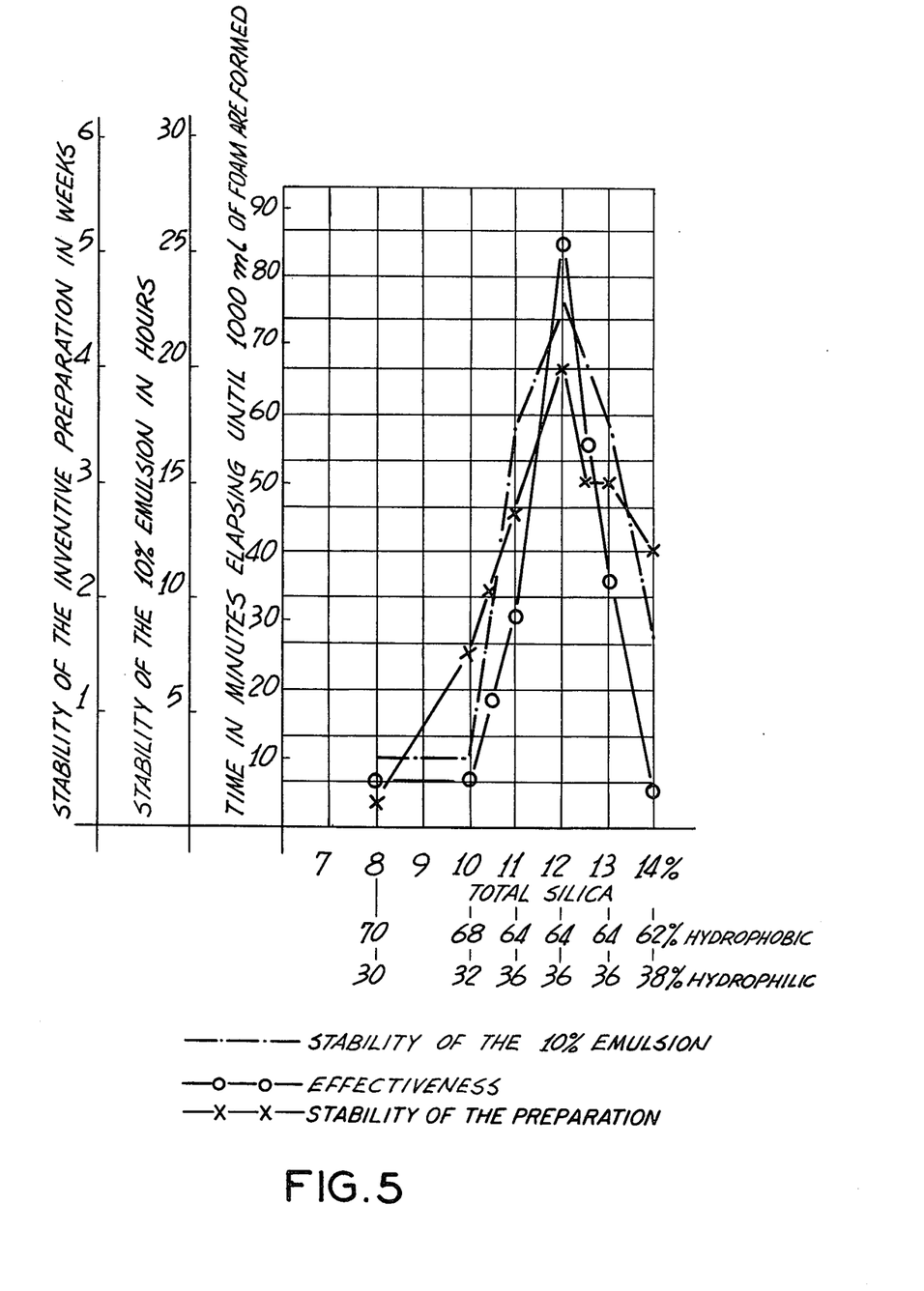

The water-dilutable preparations are produced as described in Example 1. The preparations are evaluated according to the criteria also presented in Example 1. In FIG. 5, the values found for the total amount of silica are plotted. In addition, the mixing ratios of hydrophobic silica to hydrophilic silica for each total amount of silica is noted on the abscissa.

It can also be seen from FIG. 5 that, within the experimental series of this example, all evaluating criteria described have their maximum at one and the same silica concentration and, in addition, at a quite specific mixing ratio of hydrophobic to hydrophilic silica.

EXAMPLE 6

Water-dilutable defoamer preparations are produced, which have the composition as described in Example 1.

The water-insoluble defoamer oil and also the emulsifier correspond to the compounds described in the examples. On the other hand, the silica mixture consists of a mixture of silica, hydrophobized with 40% wax and having a BET surface area of 240 m$^2$/g, and a hydrophilic silica with a BET surface area of 200 m$^2$/g.

This experimental series also resulted in a defoamer preparation, which has a maximum for all the evaluating criteria described in Example 1 at a specific composition given in the following:

81.0 parts by weight of the water-insoluble defoamer oil of Example 1, 10.0 parts by weight of the water-soluble emulsifier of Example 1, 9.0 parts by weight of a mixture of finely divided silica.

The finely divided silica consists of a mixture of 82.6 weight % of the above-described hydrophobized silica and 17.4 weight % of hydrophilic silica.

EXAMPLE 7

Water-dilutable defoamer preparations are produced which have the following composition:

80-x weight % of water-insoluble defoamer oil,
15 weight % of water-soluble emulsifier,
5 weight % of water,
x weight % of a mixture of finely divided silica.

The finely divided silica used consists of a portion of y weight % of the hydrophobized silica described in Example 1 and a portion of z weight % of the hydrophilic silica also described in Example 1, the percentages being based on the total amount of silica.

As the defoamer oil, the polypropylene glycol-dimethylpolysiloxane block copolymer which is described in Example 1 and is insoluble in water is used.

As the emulsifier, a mixture is used which consists of 70 weight % of the polyethylene polypropylene glycol-polydimethylsiloxane, described in Example 1 and 30 weight % of an ethoxylated fatty amine, which has a nitrogen content of 1.1% and a $C_2H_4O$ content of 80.6%.

In this experimental series, a defoamer preparation is obtained which has a maximum for all of the evaluating criteria described in Example 1. This optimum preparation contains 7.1 weight % of a finely divided silica which consists of a mixture of 88.8 weight % of the hydrophobized silica and 11.2 weight % of the hydrophilic silica.

We claim:

1. A defoamer composition comprising
   (a) 40-90 parts by weight of a water-insoluble defoamer oil;
   (b) 2-50 parts by weight of an emulsifier which is soluble in water and insoluble in component (a); and
   (c) 3-20 parts by weight of a mixture of finely divided hydrophobic and hydrophilic silica.

2. The defoamer composition of claim 1 which further contains water.

3. The defoamer composition of claim 1 wherein the silica portion consist of 3-97 weight percent hydrophobic silica and 97-3 weight percent hydrophilic silica.

4. The defoamer composition of claims 1 or 2, wherein the silica portion contains at least 50 weight percent of hydrophobic silica.

5. The defoamer composition of claims 1 or 2 wherein the finely divided silia contained therein has a BET surface area of more than 50 m$^2$/g.

6. The defoamer composition of claims 1 or 2 wherein the finely divided silica contained therein has a BET surface area of more than 150 m$^2$/g.

7. A process for the production of a defoamer composition comprising mixing
   (a) 40-90 parts by weight of a water-insoluble defoamer oil;
   (b) 2-50 parts by weight of an emulsifier which is soluble in water and insoluble in component (a);
and then introducing first finely divided hydrophobic silica into this mixture with intensive stirring and then adding, with further stirring, an amount of hydrophilic silica required for achieving as fine a dispersion of components (a) and (b) as possible, wherein the total amount of finely divided silica is 3-20 parts by weight.

8. The process of claim 7 wherein components (a) and (b) are mixed with heating.

9. The process of claim 7 wherein water is added to materials being mixed during or between the mixing steps.

10. The process of claim 7 wherein water is added to the defoamer composition after it is formed.

* * * * *